United States Patent [19]

Akiyama et al.

[11] Patent Number: 5,237,017
[45] Date of Patent: Aug. 17, 1993

[54] PROCESS FOR PRODUCING IMIDIZED ACRYLIC RESINS

[75] Inventors: Kazuhiko Akiyama; Yoshihiro Itagaki; Yoshifumi Murata, all of Kyowa, Japan

[73] Assignee: Kuraray Co., Ltd., Kurashiki, Japan

[21] Appl. No.: 634,507

[22] Filed: Dec. 27, 1990

[30] Foreign Application Priority Data

Dec. 27, 1989 [JP] Japan .................... 1-343262

[51] Int. Cl.$^5$ ............... C08F 22/40; C08F 26/06; C08F 8/30; C08F 8/32
[52] U.S. Cl. ................ 525/366; 525/329.9; 525/330.2; 525/379; 526/87; 526/262; 526/303.1; 526/307.2; 526/319; 526/329.7
[58] Field of Search ............ 525/379, 366, 330.2; 526/262, 329.7

[56] References Cited

U.S. PATENT DOCUMENTS

| | | | |
|---|---|---|---|
| 4,246,374 | 1/1981 | Kopchik | 525/329 |
| 4,727,117 | 2/1988 | Hallden-Abberton et al. | 525/343 |
| 4,745,159 | 5/1988 | Anzai | 525/329.9 |
| 5,110,877 | 5/1992 | Hoess | 525/378 |

FOREIGN PATENT DOCUMENTS

| | | |
|---|---|---|
| 0376748 | 7/1990 | European Pat. Off. . |
| 0376749 | 7/1990 | European Pat. Off. . |
| 1113308 | 8/1961 | Fed. Rep. of Germany . |

OTHER PUBLICATIONS

F. W. Billmeyer, Jr., "Textbook of Polymer Science," 3d Ed., 112-114 (1984) Wiley (New York).
Akiyama et al., CA 113:133094g. Abstract of JP 02,153,904 Jun. 13, 1990.

*Primary Examiner*—Joseph L. Schofer
*Assistant Examiner*—Fred Zitomer
*Attorney, Agent, or Firm*—Oblon, Spivak, McClelland, Maier & Neustadt

[57] ABSTRACT

Copolymerization is started by reacts in and acrylamide represented by the general formula $$CH_2=\underset{\underset{R_1}{|}}{C}-CONHR_2$$

wherein $R_1$ represents a hydrogen atom or a methyl group and $R_2$ represents a hydrogen atom, an alkyl group, an aryl group or an aralkyl group, with an amount of methyl methacrylate in pure methanol or methanol containing Water in an amount of not more than 30% by weight based on the total weight of methanol and water, and, an additional amount of the methyl methacrylate is added at periods during proceeding of the polymerization. The obtained copolymer is heated at 80° to 150° C. in the same solvent and in the presence of an alkaline catalyst, to an imidized acrylic resin containing glutarimide groups.

The imidized acrylic resins obtained by the process of the present invention have excellent thermal stability, transparency and color shade, and contain little acid or acid anhydride.

Where the glutarimide group is N-hydrogenglutarimide, the imidized acrylic resin is readily isolated as a particulate solid of stabilized emulsion by addition of a hydroxide and/or alcolate of an alkali metal to a solution of the imidized acrylic resin in water-containing methanol, followed by cooling. This emulsion is neutralized with an acid, separated by filtration and washed, to give a highquality imidized acrylic resin.

5 Claims, No Drawings

PROCESS FOR PRODUCING IMIDIZED ACRYLIC RESINS

BACKGROUND OF THE INVENTION

In recent years, demand for improvement in thermal resistance of acrylic resins for use in light electrical appliances and industrial machine parts, in particular parts of vehicles, has been increasing.

Imidization of methacrylic polymers is known as a conventional method for improving the thermal resistance of acrylic resins. For example, Japanese Patent Registration No. 1363497 discloses a process, for producing imidized acrylic resins that contain imide units and are soluble in DMF, which comprises reacting an acrylic resin with ammonia or a primary amine in an extruder at about 200° C. in the substantial absence of water. This process however comprises using an expensive extruder of special structure and maintaining the condition of substantial absence of water, which require complex operation, and further has the problem that the product obtained tends to be of non-uniform composition, when producing partially imidized acrylic resins. Furthermore, even when full attention is paid to maintain the condition of substantial absence of water, the obtained product inevitably contains by-product acid and acid anhydride, thereby decreasing its fluidity and increasing its water-absorptive capacity.

Japanese Patent Application Laid-open No. 20904/1985 discloses a process for producing polyglutarimide which comprises condensing polymer or copolymer of methacrylamide with a methacrylate. This process does not take into consideration the fluctuation of copolymerization composition caused by a large difference between the reactivity of methacrylamide and that of methacrylate, and hence yields only polyglutarimides with high haze value. In addition, this process comprises condensing copolymer of methacrylamide by heating at 150° to 300° C. in the absence of a solvent, and is reported to be incapable of giving a solvent-soluble polymer with a copolymerization ratio of methacrylamide exceeding 30% by weight because of occurrence of inter-molecular condensation, which is attributable to this treatment. Furthermore, the condensation reaction must be conducted at high temperature for a long period of time, which is very disadvantageous from the viewpoint of commercial production.

Japanese Patent Application Laid-open No. 191815/1988 discloses a process which comprises transforming copolymers of acrylate with (meth)acrylamide into polymers containing glutarimide by imidization in an organic solvent in the presence of an acidic compound. Since this process uses an acidic compound as an activator for imidization reaction, it requires a large amount of the acidic compound, high reaction temperature and long reaction time. Where in practice an acidic compound is used as a promoter or activator of imidization reaction, in such a trace amount as with catalysts in general, the reaction never proceeds smoothly. This process is therefore very disadvantageous when used for commerical production.

Under these circumstances, there has not been proposed any process for producing advantageously on an industrial scale, in particular, glutarimide copolymers having N-hydrogenglutarimide component and having high properties including excellent transparency.

SUMMARY OF THE INVENTION

In view of the foregoing, an object of the present invention is to provide a process for producing, advantageously from the viewpoint of commercial production, with stirred tank reactor, which is readily available, transparent imidized acrylic resins having high properties and containing substantially no by-products of acid and acid anhydride, without using ammonia or a primary amine.

The present invention provides a process for producing imidized acrylic resins comprising, in copolymerizing an acrylamide represented by the general formula

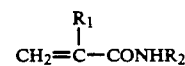

wherein $R_1$ represents a hydrogen atom or a methyl group and $R_2$ represents a hydrogen atom, an alkyl group, an aryl group or an aralkyl group, with methyl methacrylate in a solvent comprising methanol and containing not more than 30% by weight of water and in the presence of a radical polymerization catalyst, mixing beforehand part of the methyl methacylate with the acrylamide, and then effecting copolymerization while adding the rest of the methyl methacrylate to the reaction mixture, and subjecting the resulting copolymer to imidization reaction in the presence of an alkaline catalyst.

DETAILED DESCRIPTION OF PREFERRED EMBODIMENTS

Methyl methacrylate and an acrylamide represented by the general formula

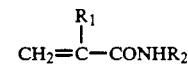

wherein $R_1$ represents a hydrogen atom or a methyl group and $R_2$ represents a hydrogen atom, an alkyl group, an aryl group or an aralkyl group, are imide-group forming starting material monomers. Thus, 2 functional groups of —$CONHR_2$ that are present in the same polymer molecule and separated via 3 carbon atoms react with each other, or 1 functional group thereof reacts with the ester group of methyl methacrylate that is present in the same molecule and separated via 3 carbon atoms from the —$CONHR_2$ group, to form 6-member cyclic imide group by the following reactions.

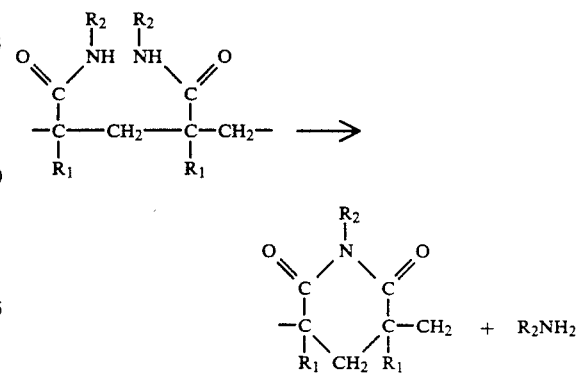

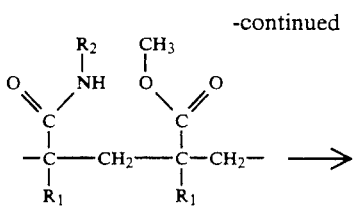

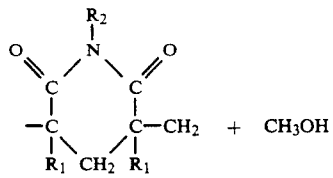

wherein $R_1$ and $R_2$ are as defined above, $R_2$ being preferably hydrogen, methyl or ethyl, and most preferably hydrogen. The methyl methacrylate used may contain in an amount of less than 0.1 molar equivalent relative to the methyl methacrylate of an acrylate and/or aromatic vinyl compound. If an acrylate and/or aromatic vinyl compound in an amount exceeding 0.1 molar equivalent is used, the properties of the resulting polymer will be adversely affected, such as increase in residual amide groups and decrease in heat deflection temperature.

It is particularly preferred, that pure methanol or methanol containing a trace or small amount of water be used as the solvent in the polymerization and imidization of the present invention. This is very important based on the following 6 grounds.

1. Methanol can fully dissolve the alkaline compounds that are effective catalysts for imidization reaction as later described herein in more detail.

2. The presence of methanol in the reaction system can prevent by-production of acid or acid anhydride even when water is mixed thereinto.

3. Where alcohols other than methanol are used as the solvent, the ester group of methyl methacrylate undergo transesterification reaction with the solvent alcohols, thereby decreasing the heat deflection temperature of the product polymer. With the solvent of polyhydric alcohols or esters thereof, the resulting polymer will contain a crosslinked structure, which impairs the fluidity. On the other hand, methanol can maintain the ester group of the methyl methacrylate component.

4. Where methacrylamide or acrylamide is used, it cannot form a copolymer having uniform composition in the absence of a solvent because it does not dissolve in methyl methacrylate. Here, methanol containing not more than 30% by weight, based on the total weight of methanol and water can dissolve hydrophilic methacrylamide or acrylamide, both of which are soluble in lyophilic methyl methacrylate, to form a uniform solution. In addition, methacrylamide and acrylamide are, in their pure state, crystalline solid, and hence their polymerisation reaction cannot be inhibited by a polymerization inhibitor, whereby they tend to partly convert to polymer. The polymer thus formed will, even in a small amount, markedly impair the transparency of the intended product of imidized acrylic resin. For methacrylamide or acrylamide that is present in a solution, a polymerization inhibitor acts effectively, to prevent their polymerization.

5. Methanol or water-containing methanol has been considered to be incapable of dissolving polymethyl methacrylate. The present inventors, however, found that, quite unexpectedly, pure methanol or methanol containing water in an amount of not more than 30% by weight based on the total weight of methanol and water can dissolve nearly uniformly and to a sufficient concentration for employment on an industrial scale, the copolymer before imidization and the imidized copolymer obtained by the process of the present invention by heating at not lower than 80° C., preferably not lower than 100° C. under an autoclave pressure. It is essentially necessary for the purpose of obtaining a transparent imidized acrylic resin that the product copolymer be present in a uniform solution. If methanol contains more than 30% by weight based on the total weight of methanol and water of water, the copolymer that forms cannot dissolve in the solvent in a sufficiently high concentration for conducting commercial production, and cannot yield a transparent imidized acrylic resin.

6. The imidized polymer is insoluble in pure methanol or water-containing methanol at room temperature, whereby it precipitates in the solid form from the reaction mixture and then gives the objective product by, separation by for example, filtration and by washing with methanol and/or water that effectively removes the alkaline catalyst used.

An objective substance of imidized acrylic resin having unsubstituted nitrogen atom, i.e. having N-hydrogenglutarimide group can be isolated on an industrial scale by the use of water-containing methanol as solvent. The mechanism of this isolation is based on the fact that N-hydrogenglutarimide resin dissolved by heating in water-containing methanol, isolates by addition of a hydroxide and/or alcolate of an alkali metal in an appropriate amount and by cooling with stirring, while forming a stable emulsion, as solid particles.

From the above grounds 1 through 6, it is clear that the discovery of methanol containing not more than 30% by weight, based on the total weight of methanol and water, being usable as solvent has essential significance in the present invention.

The methanol used may be free of water or contain a trace (not more than 5% by weight based on the total weight of methanol and water) or a small amount (5 to 30% by weight on the same basis) of water. Where an imidized acrylic resin having N-hydrogenglutarimide groups is isolated as an emulsion from its solution, methanol containing a small amount (5 to 30% by weight on the above basis) of water must be used. The amount of solvent used in polymerization and imidization is 0.1 to 10 parts by weight based on the total weight of the monomers used, preferably 0.5 to 2 parts by weight on the same basis.

Examples of the radical polymerization catalyst used in the present invention are organic peroxides such as di-t-butyl peroxide, dicumyl peroxide, methylethyl ketone peroxide, di-t-butyl perphthalate, t-butyl perbenzoate and t-butyl peracetate and azo compounds such as azobisisobutyronitrile, azobisisobutanol diacetate, 1,1-azobiscyclohexanecarbonitrile, 2-phenylazo-2,4-dimethyl-4-methoxyvaleronitrile and 2-cyano-2-propylazoformamide. These radical polymerization catalysts may be used singly or in combination of 2 or more.

The polymer that forms can be of the desired degree of polymerization by using an agent for adjusting degree of polymerization, for which mercaptans are preferably used. Examples of mercaptans are n-butylmercaptan, isobutylmercaptan, n-octylmercaptan, n-dodecylmercaptan, sec-dodecylmercaptan, t-butylmercaptan, phenylmercaptan, thiocresol and thioglycolic acid and esters thereof.

The amounts of the radical polymerization catalyst and agent for adjusting degree of polymerization are appropriately selected depending on their type, temperature and time of polymerization, the desired degree of polymerization and like factors.

In the polymerization process of the present invention, a semi-batch system is employed. Acrylamides generally have reactivity greatly different from that of methyl methacrylate. As a result, in a batch system where the total amount of both monomers is charged into a stirred-tank reactor to effect polymerization therein, polymers having different copolymerization compositions will form during the progress of the polymerization. This fact causes the imidized acrylic resin that forms by imidization reaction to deteriorate in transparency or, in an extreme case, to be a white-turbid opaque polymer. Semi-batch polymerization can give transparent imidized acrylic resins. The polymerization process of the present invention is herewith described in more detail with reference to an example.

An autoclave is charged with methanol, water, an acrylamide, a polymerization catalyst, an agent for adjusting degree of the polymerization and part of methyl methacrylate, and the mixture is uniformly dissolved with stirring. At this time nitrogen gas is passed into the system to remove oxygen. The mole ratio of methyl methacrylate to the acrylamide to be charged in the first place is determined by calculation according to the copolymerization reactivities, $r_1$ and $r_2$, which correspond to methyl methacrylate and acrylamide respectively, measured in the mixed solvent and under conditions of desired copolymerization composition and temperature employed for the two monomers. The autoclave is heated to a temperature of 80° to 150° C., preferably 100° to 120° C., whereby polymerization starts. From this time on, the rest of the methyl methacrylate is continuously fed through a metering pump. The amount of this feed is important for obtaining transparent imidized acrylic resin. The basic principle in conducting this feed is to feed methyl methacrylate at such a rate as to maintain the composition ratio of the two monomers, i.e. methyl methacrylate and acrylamide, in the polymerization reaction system to be, during the polymerization reaction, always equal to that initially charged.

The above-described composition ratio of the two monomers is selected depending on the intended content of glutarimide in the objective product imidized acrylic resin. The rates of polymerization of the two monomers in the polymerization system employed are each determined beforehand by batch process under the same reaction conditions. According to the principle of feeding described above, the relationship between the feed rate of methacrylate and time after the start of polymerization during the polymerization is shown by a continuously reducing curve. In practice, it is sufficient to control the feed rate stepwise, while approximating it to this curve, for the purpose of obtaining transparent imidized acrylic resin.

In the polymerization reaction by semi-batch process of this type, methyl methacrylate is used in a mole ratio of 0.5 to 10 to the mole of acrylamide. Part of the amount of methyl methacrylate is first mixed with acrylamide, and the rest of methyl methacrylate is continuously fed as the polymerization proceeds. If methyl methacrylate is used in a total amount of less than 0.5 mole ratio, imidization reaction will not proceed smoothly, thereby causing unfavorable amide groups to remain in the chain of the resulting polymer. If on the other hand more than 10 moles per mole of acrylamide of methyl methacrylate is used, the resulting polymer will show hardly improved heat deflection temperature as compared with polymethyl methacrylate.

In the polymerization reaction, it is important that the conversion of the acrylamide be at least 90%. Otherwise, the reaction mixture in the succeeding imidization reaction will become yellow and the obtained imidized acrylic resin will also become yellow.

Imidization is performed after the polymerization. The reaction may be performed in the polymerization reactor or, preferably in a separate stirred-tank reactor.

In the present invention, an alkaline catalyst must be used to accelerate the afore-mentioned two types of imidization reaction, and inorganic alkalis or organic alkalis are used for this purpose. Examples of inorganic alkalis are hydroxides of alkali metals such as potassium hydroxide, sodium hydroxide and lithium hydroxide; and examples of organic alkalis are imines such as 2-phenylmethylimidazole, guanidine and 1,8-diazabicyclo-(5,4,0)undecene-7 and alcolates of alkali metals such as sodium methoxide, potassium methoxide, sodium ethoxide and potassium ethoxide.

The alkaline catalyst is added in an amount of 0.001 to 1% by weight based on the total weight of the monomers, preferably 0.01 to 0.5% by weight on the same basis. With an addition of the alkaline catalyst in an amount of less than 0.001% the imidization reaction does not proceed smoothly at a preferred imidization temperature, while with the amount exceeding 1% by weight the catalyst mixes into the polymer in a considerably large amount, thereby deteriorating the polymer properties.

Imidization reaction proceeds, in the presence of an alkaline catalyst, at a temperature of 80° to 150° C., preferably 100 to 120° C. At a temperature lower than 80° C. the imidization reaction does not proceed smoothly, while at a temperature higher than 150° C. the polymer colors significantly.

The reaction time varies depending on the reaction temperature, the type and amount of the alkaline catalyst used, the type and copolymerization ratio of the acrylamide and like factors, and it must be long enough to substantially completely convert the amide groups in the copolymer to glutarimide groups. If the reaction is incomplete and the amide groups remain, the obtained imidized acrylic resin will have poor thermal stability and transparency and increased water absorption capacity.

The conversion of imidization is determined by, for example, $^1$H-NMR spectrometry. Where methacrylamide is used as acrylamide, there appears in the $^1$H-NMR spectrum, measured in d-DMSO, an absorption band originating from residual amide groups at about 6.6 ppm, the integrated intensity of which gives by calculation the amount of the residual amide groups and, further, conversion.

The polymer having completed imidization reaction solidifies and is isolated when the reaction mixture is cooled down to a room temperature. The polymer thus isolated is separated from the reaction mixture, washed with a large amount of the solvent and dried. Where the alkaline catalyst has been used in a very small amount, pelletized imidized acrylic resin can directly be obtained through an extruder having a devolatilization function.

The present inventors have further found a still more preferred polymer recovery process to be applicable to imidized acrylic resins having unsubstituted nitrogen atom, i.e. ones having n-hydrogenglutarimide groups. This process is based on the finding that imidized acrylic resins having N-hydrogenglutarimide group dissolved by heating in a mixed solvent of methanol and water is isolated as particulate solid by addition of a hydroxide and/or alcoholate of an alkali metal and the succeeding cooling with stirring of the mixture. It is very important that the solvent contain water. Imidized acrylic resins form blocks in pure methanol solvent and their handling will be difficult.

The mixing ratio of methanol and water is 5 to 30% by weight, based on the total weight of methanol and water, of water, preferably 10 to 30% by weight of water on the same basis.

It is preferred to add a hydroxide and/or alcoholate of an alkali metal to the imidized acrylic resin being completely or almost completely dissolved in the mixed solvent. It is still more preferred that the addition be made not all at once but from time to time during the cooling process, for the purpose of suppressing by-production of acid units by hydrolysis of methyl methacrylate component.

The amount of a hydroxide and/or alcoholate of an alkali metal added, required for the particle-form isolation of imidized acrylic resin, varies depending on various factors such as the impurities contained in the imidized acrylic resin, amounts of unreacted monomers, temperature and time of heating and the state of stirring during cooling, and is generally 5 to 200 mmoles per 100 g of the imidized acrylic resin.

A small amount of a surfactant can be used as a dispersing agent, together with the hydroxide and/or alcoholate of an alkali metal. The surfactant is preferably used in a small amount since it tends to impair the thermal stability, color and transparency of imidized acrylic resins. Concrete examples of usable surfactants are higher aliphatic alcohols, higher aliphatic acid monoglycerides, alkyl phosphates and their salts and nonion surfactants.

After the cooling, the liquid containing the isolated imidized acrylic resin is neutralized with an acid. The neutralization not only increases recovery ratio of the imidized acrylic resin but greatly improves its thermal stability. Both inorganic acids and organic acids are usable for the neutralization, among which particularly preferred are those acids, metal salts of which have a large solubility in the solvent, such as hydrochloric acid, nitric acid and acetic acid. While the neutralization can be conducted with heating, too high a temperature should be avoided because otherwise the imidized acrylic resin will condense to blocks.

Here, heating at 35° to 70° C. with stirring the slurrystate liquid having been neutralized can contribute to enlargement of particles of the resin solid.

After completion of the neutralization, the slurrystate liquid is filtered by an appropriate process, and the particulate resin recovered is further washed with the solvent and dried. The particulate resin is pelletized through an extruder.

The imidized acrylic resin thus obtained can be subjected to injection molding or extruding molding as it is. If necessary, antioxidants such as phosphites and hindered phenols and light stabilizers such as benzotriazoles and hindered amines are added. Also lubricants, such as liquid paraffine, higher aliphatic acids having 8 to 22 carbon atoms and metal salts thereof, higher aliphatic alcohols represented by stearyl alcohol, dibutyl and dioctyl esters of adipic acid, sebacic acid and the like, and mono-, di- and triglyceride of higher aliphatic acids can be added.

Other features of the present invention will become apparent in the course of the following descriptions of exemplary embodiments which are given for illustration of the invention and are not intended to be limiting thereof.

In the examples that follow, various properties of the polymer are those measured according to the following methods.

(1) Reduced viscosity of polymer

Flow-down time ($t_s$) of a 0.5 g/dl polymer solution in dimethylformamide and that ($t_O$) of dimethylformamdie are measured with Ostwald viscosimeter at 25°±1° C. The relative viscosity, $\eta_{rl}$, is obtained from $t_s/t_O$, then the reduced viscosity is:

Reduced viscosity $= (\eta_{r1} - 1)/0.5$ (2) Total light transmittance (%) of molded article
ASTM D1003 is applied.

(3) Heat deflection temperature
ASTM D648 is applied.

(4) Content of glutarimide group (mol %)
Calculated from the integrated intensity of an absorption band at 3.57 ppm, which is characteristic to glutarimide, in 270 MHz NMR spectrum.

(5) Thermal decomposition initiating temperature

A thermal gravimetric analyzer (TGA) is used. This temperature is defined to be the temperature at which a 5-mg specimen heated under an atmosphere of nitrogen gas at a temperature-elevating rate of 10° C./min starts decreasing its weight.

EXAMPLES

Example 1

A 2-l autoclave equipped with a stirrer, thermometer and metering pump was charged with 282 g of methyl methacrylate, 152 g of methacrylamide, 565 g of methanol, 4.3 g of di-t-butyl peroxide and 0.7 g of n-octylmercaptan and the mixture was heated at 120° C. with stirring, whereby copolymerization started. As the polymerization proceeded, 400 g in all of methyl methacrylate was continuously added through the metering pump at first at a rate of 3.0 ml/min for 30 minutes, then, successively at 2.5 ml/min for 40 minutes, at 2.0 at ml/min for 50 minutes, 1.5 ml/min for 60 minutes, and, lastly, at 0.5 ml/min for 40 minutes. The copolymerization was conducted for 6 hours.

Thereafter, 50 ml of a solution containing 1.1 g of sodium methoxide in methanol was fed through the metering pump to the same autoclave at the same temperature. The mixture was subjected to reaction with stirring for 1.5 hours, after completion of which the system was allowed to cool. When the inside temperature decreased to 45° C., the precipitates were withdrawn, washed with methanol and dried at 130° C. under reduced pressure for 1 day, to give a polymer.

Infrared absorption and $^1$H-NMR spectrometries were conducted on this reaction product. The infrared absorption spectrum showed absorptions from the imide group of glutarimide at 3250 cm$^{-1}$, 3100 cm$^{-1}$ and 1690 cm$^{-1}$. The $^1$H-NMR spectrum showed the absorption of glutarimide proton at 10 ppm and that of the methyl proton of glutarimide at 1.25 ppm. Accordingly, the product was confirmed to be a copolymer containing glutarimide groups. The absorption of unreacted amide groups, which should have appeared at 6.6 ppm in the NMR spectrum, could not be detected.

Table 1 shows the properties of the obtained polymer.

Example 2

The same autoclave as that used in Example 1 was charged with 257 g of methyl methacrylate, 257 g of methacrylamide, 790 g of methanol containing 20 g of water, 6.5 g of di-t-butyl peroxide and 1.3 g of n-octylmercaptan and the mixture was heated at 120° C. with stirring, whereby copolymerization started. As the polymerization proceeded, 224 g in all of methyl methacrylate was continuously added through the metering pump at first at a rate of 1.5 ml/min for 60 minutes, then, successively at 1.0 ml/min for 60 minutes and, lastly, at 0.5 ml/min for 180 minutes. The copolymerization was conducted for 7 hours.

Thereafter, 50 ml of a solution containing 1.1 g of sodium methoxide in methanol was fed through the metering pump to the same autoclave at the same temperature. The mixture was subjected to reaction with stirring for 1.5 hours, after completion of which the system was allowed to cool. When the inside temperature decreased to 45° C., the precipitates were withdrawn, washed with methanol and dried at 140° C. under reduced pressure for 1 day, to give a polymer.

Infrared absorption and $^1$H-NMR spectrometries were conducted on this reaction product. The infrared absorption spectrum showed absorptions from the imide group of glutarimide at 3250 cm$^{-1}$, 3100 cm$^{-1}$ and 1690 cm$^{-1}$. The $^1$H-NMR spectrum showed the absorption of glutarimide proton at 10 ppm and that of the methyl proton of glutarimide at 1.25 ppm. Accordingly, the product was confirmed to be a copolymer containing glutarimide groups. Trace of the absorption of unreacted amide groups was observed at 6.6 ppm in the NMR spectrum. The conversion of amide groups was calculated from the integrated intensity of this absorption, to give 99%.

Table 1 shows the properties of the obtained polymer. The heat deflection temperature was as high as 167° C., and the total light transmittance was 90%, thus proving its excellent transparency.

Example 3

The same autoclave as that used in Example 1 was charged with 158 g of methyl methacrylate, 267 g of methacrylamide, 789 g of methanol, 6.1 g of di-t-butyl peroxide and 1.2 g of n-octylmercaptan and the mixture was heated at 120° C. with stirring, whereby copolymerization started. As the polymerization proceeded, 154 g in all of methyl methacrylate was continuously added through the metering pump at first at a rate of 1.0 ml/min for 100 minutes, and then at 0.5 ml/min for 50 minutes. The copolymerization was conducted for 7 hours.

Thereafter, 50 ml of a solution containing 1.1 g of sodium methoxide in methanol was fed through the metering pump to the same autoclave at the same temperature. The mixture was subjected to reaction with stirring for 1.5 hours, after completion of which the system was allowed to cool. When the inside temperature decreased to 45° C., the precipitates were withdrawn, washed with methanol and dried at 140° C. under reduced pressure for 1 day, to give a polymer.

Infrared absorption and $^1$H-NMR spectrometries were conducted on this reaction product, and the product was confirmed to be a copolymer containing glutarimide groups. Trace of the absorption of unreacted amide groups was observed at 6.6 ppm in the NMR spectrum. The conversion of amide groups was calculated from the integrated intensity of this absorption, to give 96%.

Table 1 shows the properties of the obtained polymer. The thermal deformation temperature was 193° C., which is extremely high, and the total light transmittance was 87%, thus proving its excellent transparency.

Example 4

The same autoclave as that used in Example 1 was charged with 245 g of methyl methacrylate, 110 g of methacrylamide, 916 g of methanol, 5.0 g of di-t-butyl peroxide and 0.8 g of n-octylmercaptan and the mixture was heated at 120° C. with stirring, whereby copolymerization started. As the polymerization proceeded, 373 g in all of methyl methacrylate was continuously added through the metering pump at first at a rate of 2.0 ml/min for 60 minutes, then, successively at 1.5 ml/min for 60 minutes, 1.0 ml/min for 120 minutes, and, lastly, at 0.5 ml/min for 80 minutes. The copolymerization was conducted for 7 hours.

Thereafter, 50 ml of a solution containing 1.1 g of sodium methoxide in methanol was fed through the metering pump to the same autoclave at the same temperature. The mixture was subjected to reaction with stirring for 1.5 hours, after completion of which the system was allowed to cool. When the inside temperature decreased to 45° C., the precipitates were withdrawn, washed with methanol and dried at 120° C. under reduced pressure for 1 day, to give a polymer.

Infrared absorption and $^1$H-NMR spectrometries were conducted on this reaction product. The infrared absorption spectrum showed absorptions from the imide group of glutarimide at 3250 cm$^{-1}$, 3100 cm$^{-1}$ and 1690 cm$^{-1}$. The $^1$H-NMR spectrum showed the absorption of glutarimide proton at 10 ppm and that of the methyl proton of glutarimide at 1.25 ppm. Accordingly, the product was confirmed to be a copolymer containing glutarimide groups. Trace of the absorption of unreacted amide groups was observed at 6.6 ppm in the NMR spectrum. The conversion of amide groups was calculated from the integrated intensity of this absorption, to give 96%.

The obtained polymer showed a heat deflection temperature of 129° C., and a total light transmittance of 85%, thus proving its high thermal resistance and transparency.

Example 5

The same autoclave as that used in Example 1 was charged with 158 g of methyl methacrylate, 307 g of methacrylamide, 789 g of methanol, 6.1 g of di-t-butyl peroxide and 1.2 g of n-octylmercaptan and the mixture was heated at 120° C. with stirring, whereby copolymerization started. As the polymerization proceeded, 160 g in all of methyl methacrylate was continuously added through the metering pump at first at a rate of 1.0 ml/min for 100 minutes and then at 0.5 ml/min for 50 minutes. The copolymerization was conducted for 7 hours.

Thereafter, 50 ml of a solution containing 1.1 g of sodium methoxide in methanol was fed through the metering pump to the same autoclave at the same temperature. The mixture was subjected to reaction with stirring for 1.5 hours, after completion of which the system was allowed to cool. When the inside temperature decreased to 45° C., the precipitates were withdrawn, washed with methanol and dried at 130° C. under reduced pressure for 1 day, to give a polymer.

Infrared absorption and $^1$H-NMR spectrometries were conducted on this reaction product. The infrared absorption spectrum showed absorptions specific to glutarimide at 1660 cm$^{-1}$ and 742 cm$^{-1}$. The $^1$H-NMR spectrum showed the absorption of the methyl proton of glutarimide at 1.25 ppm. Accordingly, the product was confirmed to be a copolymer containing glutarimide groups.

Table 1 shows the properties of the obtained polymer.

TABLE 1

|  | Ex. 1 | Ex. 2 | Ex. 3 | Ex. 5 |
| --- | --- | --- | --- | --- |
| Reduced viscosity (dl/g) | 0.49 | 0.43 | 0.34 | 0.38 |
| Glutarimide content (mol %) | 26 | 49 | 71 | 68 |
| Heat deflection temperature (°C.) | 140 | 167 | 193 | 141 |
| Thermal degradation initiating temperature (°C.) | 296 | 308 | 315 | 313 |
| Total light transmittance (%) | 89 | 90 | 87 | 89 |

Example 6

The same autoclave as that used in Example 1 was charged with 282 g of methyl methacrylate, 152 g of methacrylamide, 590 g of methanol, 56 g of water, 4.3 g of di-t-butyl peroxide and 0.7 g of octylmercaptan and the mixture was heated at 120° C. with stirring, whereby copolymerization started. As the polymerization proceeded, 400 g in all of methyl methacrylate was continuously added through the metering pump at first at a rate of 3.0 ml/min for 30 minutes, then, successively at 2.5 ml/min for 40 minutes, 2.0 ml/min for 50 minutes, 1.5 ml/min for 60 minutes and, lastly, at 0.5 ml/min for 40 minutes. The copolymerization was conducted for 6 hours.

Thereafter, 50 ml of a solution containing 1.1 g of sodium methoxide in methanol was fed through the metering pump to the same autoclave at the same temperature. The mixture was subjected to reaction with stirring for 1.5 hours.

After completion of the reaction, the autoclave was connected via a sampling nozzle and piping with a separate 2-l autoclave. While the sampling nozzle and the connecting piping were heated at 120° C. with a ribbon heater, the newly connected autoclave was pressurized under 5 kg/cm$^2$ by nitrogen gas. The autoclave containing the polymer solution was pressurized under 7 kg/cm$^2$ by nitrogen gas, and the valve of the sampling nozzle was opened to transfer the polymer solution to the newly connected autoclave. When the inside temperature decreased to 45° C., the precipitates were withdrawn, washed with methanol and dried at 130° C. under reduced pressure for 1 day, to give a polymer.

Infrared absorption and $^1$H-NMR spectrometries were conducted on this reaction product. The infrared absorption spectrum showed absorptions from the imide group of glutarimide at 3250 cm$^{-1}$, 3100 cm$^{-1}$ and 1690 cm$^{-1}$. The $^1$H-NMR spectrum showed the absorption of glutarimide proton at 10 ppm and that of the methyl proton of glutarimide at 1.25 ppm. Accordingly, the product was confirmed to be a copolymer containing glutarimide groups. The absorption of unreacted amide group, which should have appeared at 6.6 ppm, was not detected.

Further $^{13}$C-NMR spectrometry was conducted on this polymer. The absorption of the carbonyl carbon of carboxylic acid group, which should have appeared at about 180 ppm, could not be detected.

COMPARATIVE EXAMPLE 1

The same autoclave as that used in Example 1 was charged with 244 g of methyl methacrylate, 131 g of methacrylamide, 751 g of methanol, 5.0 g of di-t-butyl peroxide and 0.8 g of n-octylmercaptan and the mixture was heated at 120° C. with stirring, whereby copolymerization started. The polymerization was allowed to proceed for 3 hours, without the feeding of methyl methacrylate.

Thereafter, 50 ml of a solution containing 1.0 g of sodium methoxide in methanol was fed through the metering pump to the same autoclave at the same temperature. The mixture was subjected to reaction with stirring for 1.5 hours, after completion of which the system was allowed to cool. When the inside temperature decreased to 45° C., the precipitates were withdrawn, washed with methanol and dried at 120° C. under reduced pressure for 1 day, to give a polymer.

Infrared absorption and $^1$H-NMR spectrometries conducted on the reaction product revealed that it is a polymer containing glutarimide groups. Although the polymer had excellent thermal resistance, showing a heat deflection temperature of 159° C., it was inferior in transparency, showing a total light transmittance of only 58%.

Example 7

A 300-ml autoclave equipped with a stirrer, thermometer and metering pump was charged with 10 g of the imidized acrylic resin obtained in Example 1. To this resin were added 14 g of water and 56 g of methanol and the mixture was stirred at 80° C. and then further heated with stirring to 100° C. To the mixture an alkali solution containing 0.05 g of sodium hydroxide, 4 g of water and 16 g of methanol was added and the mixture was stirred at 500 rpm for 30 minutes, and cooled, with stirring, at a rate of −25° C./min. The contents was taken out at 30° C., and neutralized with acetic acid to a pH of 6.2, whereby the emulsified polymer completely precipitated in the form of fine particles. The reaction mixture was then heated to a temperature of 55° C. with stirring and then allowed to cool to room temperature. The polymer was separated by filtration, washed with a mixed solution of water/methanol of 20/80 by weight, which was then removed by filtration, further washed with water, and dried. The thus obtained imidized acrylic resin was a white powder and contained no salts at all. The powder had an average particle diameter of 230 microns.

Obviously, numerous modifications and variations of the present invention are possible in light of the above teachings. It is therefore to be understood that within the scope of the appended claims, the invention may be practiced otherwise than as specifically described herein.

What is claimed is:

1. A process for producing imidized acrylic resins comprising copolymerizing an acrylamide represented by the general formula $$CH_2=\underset{\underset{R_1}{|}}{C}-CONHR_2$$

wherein $R_1$ represents a hydrogen atom or a methyl group and $R_2$ represents a hydrogen atom, an alkyl group, an aryl group, or an aralkyl group, with methyl methacrylate in a solvent comprising methanol and in the presence of a radical polymerization catalyst, including mixing beforehand part of the methyl methacrylate with the acrylamide, and then effecting copolymerization while adding the rest of the methyl methacrylate to the reaction mixture, and then subjecting the resulting copolymer to imidization reaction in the presence of an alkaline catalyst.

2. A process according to claim 1, wherein said solvent is methanol containing water in an amount of not more than 30% by weight based on the total weight of methanol and water.

3. A process according to claim 1 or claim 2, wherein methyl methacrylate is used in a total amount of 0.5 to 10 moles per mole of said acrylamide.

4. A process according to any one of claims 1 through 3, wherein said imidized acrylic resins contain N-hydrogenglutarimide rings.

5. A process for treating imidized acrylic resins, which comprises adding a hydroxide and/or alcoholate of an alkali metal to the imidized acrylic resins obtained according to the process of claim 4, cooling the mixture with stirring and neutralizing the mixture by addition of an acid.

* * * * *